April 7, 1925.  
F. ENGEL  
1,532,738  
COMBINED BATTERY SHIPPING CRATE AND STAND  
Filed Oct. 3, 1919  
2 Sheets-Sheet 1
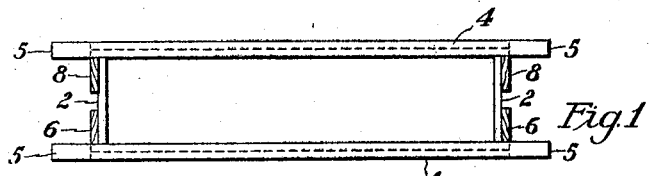
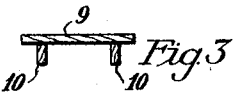
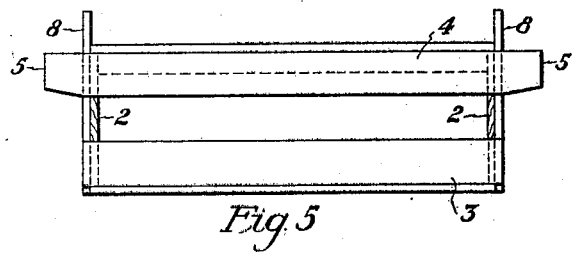
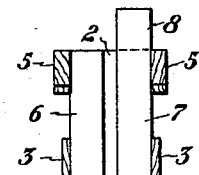
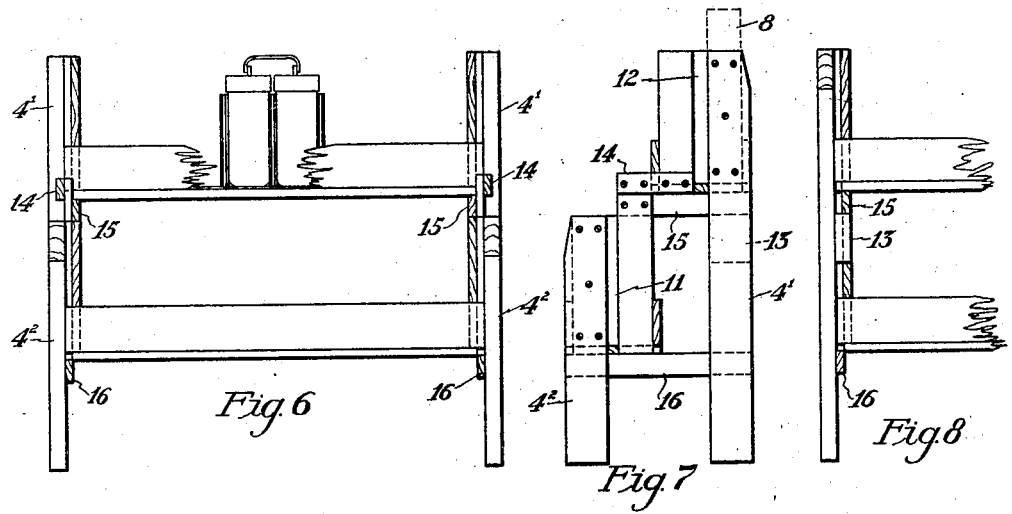
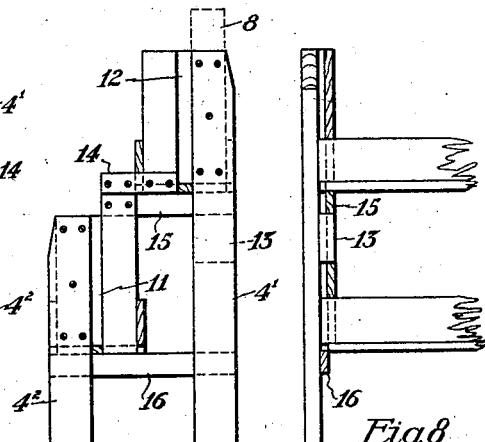
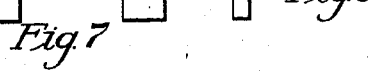
WITNESS:
INVENTOR.  
Frank Engel.  
BY  
ATTORNEY.

April 7, 1925.
F. ENGEL
1,532,738
COMBINED BATTERY SHIPPING CRATE AND STAND
Filed Oct. 3, 1919     2 Sheets-Sheet 2
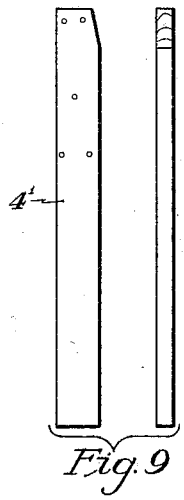
Fig.9
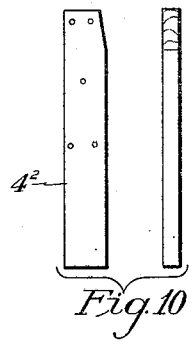
Fig.10
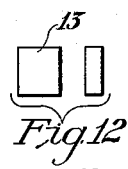
Fig.11
Fig.12
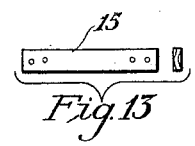
Fig.13
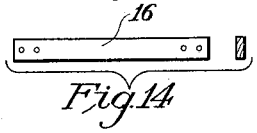
Fig.14
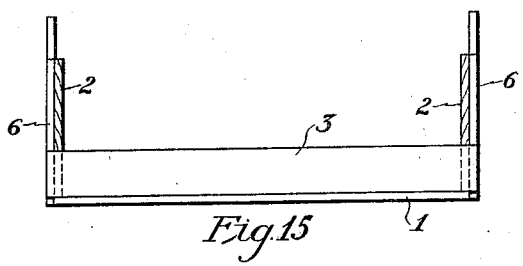
Fig.15
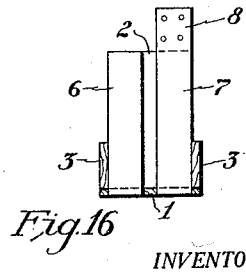
Fig.16
WITNESS:
INVENTOR.
Frank Engel.
BY
ATTORNEY.

Patented Apr. 7, 1925.

1,532,738

UNITED STATES PATENT OFFICE.

FRANK ENGEL, OF NIAGARA FALLS, NEW YORK, ASSIGNOR TO U. S. LIGHT & HEAT CORPORATION, OF NIAGARA FALLS, NEW YORK, A CORPORATION OF NEW YORK.

COMBINED BATTERY SHIPPING CRATE AND STAND.

Application filed October 3, 1919. Serial No. 328,197.

*To all whom it may concern:*

Be it known that I, FRANK ENGEL, a citizen of the United States, residing at Niagara Falls, in the county of Niagara and State of New York, have invented new and useful Improvements in Combined Battery Shipping Crates and Stands, of which the following is a specification.

The present invention relates to combined battery shipping crate and stand.

More particularly the present invention relates to structure for safely packing and shipping storage battery cells, to the end that said structure may be readily available for use as a stand or cabinet upon which said battery cells may be mounted when in service. The present invention is particularly applicable to structure for the packing and shipping of batteries for isolated plants, frequently referred to as farm lighting plants. Such batteries must be safely packed for shipment and should be so mounted when in service that they present an orderly arrangement, with the various cells readily accessible for inspection and filling.

The present invention has for one of its objects the provision of structure suitable for the packing and shipping of storage battery cells, which structure is readily available, with the exercise of a minimum amount of skill or discretion, as a suitable stand for said cells while said cells are in service.

A further object is to provide sturdy crating structure for battery cells, which, without the addition of any other parts, is readily adaptable for use as a battery stand while the cells are in service.

Further objects will appear as the description proceeds.

Referring to the drawings:—

Fig. 1 is a top plan view of the crate with the cover removed.

Figs. 2 and 3 are side and end elevations respectively of the cover for the crate illustrated in Fig. 1.

Fig. 4 is an end elevation, with cover removed, of said crate.

Fig. 5 is a side elevation of the crate with the cover in place.

Figs. 6, 7 and 8 are views in front, side and rear elevation respectively of a stand made up of the parts of two crates such as illustrated in Figs. 1 to 5.

Figs. 9 to 16 represent details of two crates which, when secured together, form a battery stand according to the present invention.

According to the present invention, the storage battery which is to be packed is divided, part of the cells being placed in one crate and the remainder of the cells being placed in a second crate. No difference need be made in the two crates. The two crates provide all the material necessary for the battery stand illustrated in Figs. 6 to 8, only a very few saw cuts being necessary to provide the proper lengths of a few of the members. With a saw and a hammer, anyone, though possessing a minimum of mechanical skill, can readily convert the two crates into the battery stand above referred to.

Referring first to the crates which are used for packing and shipping, and one of which is illustrated in Figs. 1 to 5, the bottom is indicated by the numeral 1, while end pieces secured thereto are indicated by the numerals 2, 2. Side pieces 3, 3 serve to connect and hold the end pieces, which side pieces 3, 3 may be located adjacent to the bottom 1 and may or may not be fastened to said bottom 1. Side bars 4, 4, which may be of heavier material than side pieces 3, 3, also connect and hold the end pieces 2, 2, being located adjacent to the top of said end pieces. Said side bars will preferably be longer than the bottom 1 and side pieces 3, 3 and will be mounted to provide handles 5, 5. Reinforcing members 6 and 7 will be provided for each end piece 2 and will be fastened thereto to strengthen same. Members 3, 3 and 5, 5 will preferably be fastened, not only to the end pieces 2, 2, but to the reinforcing members 6 and 7, as well. One only of each pair of these reinforcing members 6 and 7 will be extended above the top of the end pieces 2, 2. In the drawings the reinforcing member 7 is the longer one of each pair. The two members 7, 7 should be on the same side of the crate whereby to provide an unsymmetrical construction. The purpose of this construction, as will be at once apparent, is to render it unlikely that any freight handlers should so far disregard instructions as to set the crate down, bottom side up. The upstanding ends of the members 7, 7, which ends are designated 8, 8, also serve a useful purpose when two crates are employed to form a stand, as will be more particularly pointed out hereinafter.

The cover for the crate is indicated by the numeral 9. The cover 9 is provided with a pair of longitudinally extending hold-down pieces 10, 10 which may serve the purpose of holding the cover against crosswise movement before or during the time that said cover is being secured to the crate and also serve the purpose of holding the batteries from shaking in a vertical direction during shipment.

When the battery cells are to be installed, the stand therefor is made from the two crates in which said cells were packed. The stand is illustrated in Figs. 6, 7 and 8. The various members which, when secured together form the stand, are illustrated in Figs. 9 to 16, said members being parts of the crates aforesaid.

The rear legs 4', 4' of the stand are made from two side bars 4, 4 by cutting off one hande 5 from each of two side bars 4, 4. The front legs 4², 4² of the stand are made from two side bars 4, 4 by cutting off the proper lengths.

Figs. 15 and 16 indicate the frame left after the side bars 4, 4 have been removed from each of the crates. These frames are indicated by the numerals 11 and 12. The frames 11 and 12 are supported by the legs 4', 4' and 4², 4² through certain members which will be described.

The side bars 4, 4 of the crates which have been cut to provide the short legs 4², 4², also provide material for the rests 13, 13, illustrated in Fig. 12. The hold-down pieces 10, 10 provide material for the tie pieces 14 and the bridging pieces 15 and 16, which are illustrated in Figs. 11, 13 and 14 respectively. A bridging piece 16 is fastened on each side of the battery stand, being secured to legs 4' and 4². Bridging pieces 16, 16 form rests for frame 11, said frame 11 being placed intermediate of legs 4², 4², and being fastened thereto. A bridging piece 15 rests upon each end piece 2 and is fastened to an upstanding end 8. The other end of each of said pieces 15, 15 lies upon one of the rests 13, 13, which rests 13, 13 are secured to the legs 4', 4'. Frame 12 is located intermediate of legs 4', 4' and is fastened thereto. Said frame 12 rests upon bridging pieces 15, 15. The frame 12 is fastened to frame 11 by the pieces 14, 14 which are secured at one end to upstanding ends 8, 8 of re-enforcing members 7, 7, of frame 11, and at their opposite ends to the lower portions of reenforcing members 6, 6 of frame 12. The upstanding ends 8, 8 on frame 12 may be cut off, if desired.

It will be understood that the cells will be packed in the crates with sufficient packing material to prevent shaking. The cells and packing material have not been illustrated in the crates for the reason that their illustration would not aid in explaining the invention. Two cells are shown in the battery stand in Fig. 6 for the purpose of illustrating the use of said stand. It will be understood that lower frame 11 and upper frame 12 will in service, both contain cells.

The material used in carrying out the invention may be chosen as desired. Ordinarily, wood will be used, fastened together with nails or screws. The lines along which saw cuts will be made, may be plainly marked, as will also the points at which the nails or screws are to be inserted. The person setting up the battery need put nothing into the battery stand which is not in the two crates. A minimum of skill and discretion will be required to change the two crates into a sturdy battery stand which presents a good appearance.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States is:—

1. In battery packing structure, a box-like structure having a bottom piece, end pieces and side pieces, relatively heavy side bars mounted along the sides of said box-like structure and extending beyond the ends thereof to provide handling means, said end pieces having vertically extending reinforcing pieces which extend beyond the top of said box-like structure on one side only of said structure.

2. A combined battery shipping crate and service stand comprising a box-like framework having a bottom piece and side pieces adapted to form the bottom and sides of a shipping crate and the supporting shelf of a service stand, and relatively heavy side bars adapted to be attached to the sides of the framework and to extend beyond the ends thereof to provide handles and also adapted to be detached and form supporting legs for the supporting shelf.

3. A combined battery shipping crate and service stand comprising a box-like framework having a bottom piece and side pieces adapted to form the bottom and sides of a shipping crate and the supporting shelf of a service stand, relatively heavy side bars adapted to be attached to the sides of the framework and to extend beyond the ends thereof to provide handles and also adapted to be detached and form supporting legs for the supporting shelf, and a cover for said shipping crate having hold down members adapted to be detached to form connecting and supporting pieces to hold said framework in place as a supporting shelf.

In witness whereof, I have hereunto subscribed my name.

FRANK ENGEL.